United States Patent
Quentin et al.

[15] 3,644,225
[45] Feb. 22, 1972

[54] ION-EXCHANGE COPOLYMERS AND MEMBRANES MADE THEREOF

[72] Inventors: Jean Pierre Quentin, Lyon; Michel Ruaud, Villeneuve-Par-Ternay Rhone, both of France

[73] Assignee: Rhone-Poulenc S.A., Paris, France

[22] Filed: Sept. 25, 1969

[21] Appl. No.: 861,187

[30] Foreign Application Priority Data

Sept. 27, 1968  France......................................167,943

[52] U.S. Cl.............................................260/2.1 E, 260/80.3
[51] Int. Cl. ...................................................................C08f 19/00
[58] Field of Search......................................260/2.1 E, 80.3

[56] References Cited

OTHER PUBLICATIONS

Selegn et al., Bull. Soc. Chim. France 1966, 2400.
Laeuger, Ber. Bunsenges. Physik. Chem. 68, 534–41 (1964).

*Primary Examiner*—Melvin Goldstein
*Attorney*—Cushman, Darby & Cushman

[57] ABSTRACT

Ungrafted copolymers of vinyl alcohol units and vinyl monomer units containing tertiary amino groups cross-linked by reaction with a polyquaternization agent are useful for making anion-exchange membranes.

22 Claims, No Drawings

ION-EXCHANGE COPOLYMERS AND MEMBRANES MADE THEREOF

The present invention relates to anion-exchange membranes based on copolymers of vinyl alcohol and nitrogen-containing vinyl monomers.

The invention provides anion-exchange membranes in which the ionic sites are distributed uniformly and fixed firmly and durably. These membranes have a low electrical resistance and/or a high permeation selectivity, and can be used in electrochemical devices such as electricity accumulators, fuel cells, and electrodialysis devices.

The membranes of the invention are essentially based on an ungrafted copolymer comprising vinyl alcohol units and units of a vinyl monomer containing at least one tertiary nitrogen atom, cross-linked by poly-quaternary ammonium linkages of the formula:

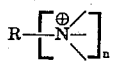

where the indicated nitrogen atoms are nitrogen atoms of units of the said vinyl monomer containing at least one tertiary nitrogen atom, R is a substituted or unsubstituted organic radical and $n$ is an integer of at least 2.

In the following text, the vinyl monomer containing at least one tertiary nitrogen atom is referred to as the "nitrogen-containing monomer."

The aforesaid copolymers are prepared by reacting a copolymer containing vinyl alcohol units and units of a vinyl monomer containing at least one tertiary nitrogen atom with a polyquaternizing agent. By a polyquaternizing agent there is understood a chemical compound capable of quaternizing at least two tertiary nitrogen atoms, and especially reactive esters of the formula: $R[X]_n$ where X is a reactive ester residue, preferably a halogen atom, e.g., chlorine, bromine, or iodine, or a sulphuric or sulphonic ester residue.

The starting copolymer of vinyl alcohol/nitrogen-containing monomer is prepared in practice by saponification of a copolymer of vinyl ester/nitrogen-containing monomer, by any process which is in itself known. Saponification processes which can be used are described in, e.g., British Pats. Nos. 607,911, 634,140, 1,057,898, 1,095,204 and 1,095,327, and French Pat. No. 1,120,921. The saponification can be total or partial; preferably more than 90 percent of the ester units are saponified. The reduced viscosity of the uncrosslinked copolymers measured in dimethylsulphoxide at 25° C., for a copolymer concentration of 5 g./l., is from 10 to 500 cc./g. and preferably from 30 to 200 cc./g.

The numerical ratio of polymerized nitrogen-containing monomer/hydroxyethylene (vinyl alcohol) units is generally between 0.02 and 0.5, preferably between 0.04 and 0.25.

The copolymer of vinyl ester/nitrogen-containing monomer is also prepared by any process which is in itself known, for example by the copolymerization processes described in French Pats. Nos. 1,120,921, 1,177,509 and 1,215,655.

The nature of the vinyl ester involved in the preparation of the copolymer of vinyl ester/nitrogen-containing monomer is not critical. As vinyl esters which can be used, the following may be quoted without implying a limitation: the formate, the acetate, the propionate, the butyrate, the isobutyrate, the myristate, the palmitate, the stearate, the cyclohexanoate, the benzoate, the toluates, the naphthoates, the campholates, and the chloracetate. However the acetate is usually employed.

The nitrogen-containing monomers which can be used are generally, but not invariably, monomers of which at least one of the carbon atoms carrying the vinyl double bond carries a cyclic radical with a tertiary intranuclear, juxtanuclear, or extranuclear nitrogen atom. Among the monomers with a tertiary intranuclear nitrogen atom, 2-vinylpyridine and 4-vinylpyridine and their substitution derivatives are particularly quoted. Among the monomers with a tertiary juxtanuclear nitrogen atom, the N,N-dialkylaminovinylbenzenes and their substitution derivatives are particularly quoted. Among the monomers with a tertiary extranuclear nitrogen, the (N,N-dialkyl)-aminoalkyl-p-vinylbenzenes and their substitution derivatives are particularly quoted.

These copolymerization and saponification operations are followed by a quaternizing cross-linking of the copolymer of vinyl alcohol/nitrogen-containing monomer by the polyquaternizing agent. The shaping of a film of the treated materials so as to prepare membranes can take place before, or preferably after, the saponification but in any case before the end of the quaternizing cross-linking.

The polyquaternizing agents used are principally polyhalogenated derivatives of alkanes, cycloalkanes or arylalkanes, especially alkylene, cycloalkylene or aralkylene dihalides and polyhalogenated polymers. Thus R is preferably alkylene of two to six carbon atoms, xylylene, methyl-xylylene, dimethyl-xylylene, or a residue (of approximate formula

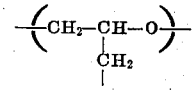

wherein $m$ is an integer greater than 1) of a polyepichlorhydrin.

The following are examples of suitable such agents: 1,3-dichloropropane, 1,3-dibromopropane, 1,4-dichlorobutane, 1,4-dibromobutane, 1,4-diiodobutane, 1,4-dichlorobutene-2, bis(chloromethyl)benzenes, bis(chloromethyl)toluenes, bis(chloromethyl)xylenes and polyepichlorhydrin.

The quaternizing cross-linking is effected by bringing the polyquaternizing agent into contact, at a temperature of 10° to 100° C., preferably 25° to 70° C., with the copolymer of vinyl alcohol/nitrogen-containing monomer, either from without, the polyquaternizing agent being in the form of a solution and the copolymer in the solid state, or from within, the polyquaternizing agent having been mixed with the copolymer before the reaction. The desirable degree of cross-linking is from 30 to 100 percent, preferably more than 60 percent.

The solvents which are optionally used during the quaternizing cross-linking are solvents which are able to dissolve the polyquaternizing agent and are also able to swell or dissolve the treated copolymer. The following are examples of suitable solvents: water, alcohols such as ethanol, propanol, isopropanol, isobutanol and tertiary butanol, and polar aprotic solvents such as dimethylsulphoxide or dimethylformamide.

The materials employed for the preparation of the membranes of the invention can be shaped into a film by any process which is in itself known, especially by extrusion, calendering, pressing or, according to a preferred process, solution casting.

The products or membranes obtained by quaternizing cross-linking of copolymers of vinyl alcohol/nitrogen-containing monomer can in addition be subjected to a simple quaternization with a monoquaternizing agent, principally for the purpose of quaternizing as great a part as possible, and preferably the whole, of the tertiary nitrogen atoms initially present. The maximum degree of monoquaternization is 70 percent. Preferably this simple quaternization is carried out after the quaternizing cross-linking. Carrying out a partial quaternization without cross-linking before the quaternizing cross-linking stage is however not excluded.

As monoquaternizing agents, esters of inorganic acids, preferably alkyl, cycloalkyl or aralkyl halides and sulphates, are principally used. Monoquaternizing agents in which the alkyl, cycloalkyl or aralkyl radical contains at most 14 carbon atoms are particularly suitable. Lower alkyl halides or sulphates, benzyl halides, and cyclohexyl halides are preferred and methyl, ethyl, propyl, benzyl and cyclohexyl chloride, bromide and iodide, and dimethyl or diethyl sulphate may be quoted especially. Halogenated derivatives containing other chemical groups, such as for example chloracetaldehyde and bromacetaldehyde, are also suitable.

The technique used for the simple quaternization is similar to that used for the quaternizing cross-linking. The products or membranes obtained in accordance with one of the operations described above, either of quaternizing cross-linking, or of simple quaternization or both, can in addition be subjected to partial or complete acetalization with an aldehyde at temperatures of 0° to 100° C., preferably 30° to 80° C. Examples of aldehydes which can be used are aliphatic or aromatic aldehydes containing one to 16 carbon atoms, especially those of the formula: R′—CHO, where R′ is hydrogen, alkyl of one to four carbon atoms, phenyl, or formyl, e.g., formaldehyde, acetaldehyde, propionaldehyde, the butyraldehydes, benzaldehyde, and furfural. Aliphatic or aromatic dialdehydes such as glyoxal, malonaldehyde, succinaldehyde, adipaldehyde, terephthaldehyde, isophthalaldehyde and bis(p-formyl)diphenylene, polyaldehydes such as polycrotonaldehyde, and halogenated aldehydes such as chloracetaldehyde and bromacetaldehyde, can also be used.

The aldehyde is used in a solvent at a concentration exceeding 0.05 percent, and is preferably 0.5 to 5 percent of the solvent. The following are examples of suitable solvents: water, alcohols such as methanol, ethanol or isopropanol, aromatic hydrocarbons such as benzene, toluene or xylene, and chlorinated hydrocarbons such as dichloromethane and dichlorethane.

It is advantageous to carry out the acetalization in the presence of a strong inorganic or organic acid, such as hydrochloric, sulphuric, perchloric, persulphuric, formic or an alkylarylsulphonic acid in an amount which is generally between 0.05 and 2 equivalents of acid per liter of liquid acetalizing medium. Cation-exchange resins in the acid form can also be used.

The products containing hydroxyl groups prepared in any of the reaction stages described above can be further modified by a thermal dehydration under similar conditions to those known for the polyvinyl alcohols.

In order to assess the properties of the membranes prepared, the following measurements were carried out:

a. Electrical substitution resistance: the electrical substitution resistance of a given membrane surface denotes the variation in electrical resistance of a liquid cylinder if the membrane is substituted for a slice of liquid of the same thickness and of the same surface area as the membrane in a position at right angles to the axis of the cylinder. In the present case this substitution resistance is measured in an aqueous 0.6 M KCl solution; it is expressed in ohm.cm.$^2$.

b. Permeation selectivity: this relates to the ability of the membrane only to allow anions to pass, while excluding cations. This permeation selectivity is deduced by calculation from the measurement of the electromotive force E which exists between two aqueous KCl solutions, respectively 0.4 M and 0.8 M, which are separated by the membrane in question which has beforehand been saturated with an aqueous 0.6 M KCl solution. The formula giving the permeation selectivity in percent is:

$$\frac{P}{100} = \frac{\bar{t}^+ - t^+}{1 - t^+}$$

in which $t^+$ is the transport number of $Cl^-$ in an 0.6 M aqueous KCl solution and $\bar{t}^+$ is the transport number of $Cl^-$ in the membrane. $\bar{t}^+$ is given by the formula:

$$\bar{t}^+ = \frac{E + Eo}{2Eo}$$

in which $Eo = (RT/F) \ln a_1/a_2$
where R = the gas constant
T = absolute temperature F = Faraday constant (96,489 coulombs per gram equivalent)

$a_1$ = activity of the electrolyte in the more concentrated compartment (calculated from the concentration of the electrolyte and the activity coefficient)

$a_2$ = activity of the electrolyte in the less concentrated compartment.

c. Bursting resistance: this is measured according to standard specification PN AFNOR Q 0314 relating to the testing of paper and cardboard. A membrane fixed to a support frame which leaves a free surface area of 10 cm.$^2$ is subjected to the action of a hydraulic pressure via a rubber membrane. The hydraulic pressure (in bars) after bursting as well as the deflection in millimeters of the incurved membrane at the moment when it bursts are measured.

d. Water transmission (measured only for Example 35). The amount of water which has migrated across a membrane placed in a cell divided into two compartments by the membrane, one compartment containing pure water while the other contains a 1.2 M aqueous KCl solution, is measured. This water transmission is expressed in mm.$^3$ per hour per cm.$^2$ of membrane and for a difference in concentration of 1 mol/liter between the two solutions.

The following examples illustrate the invention.

In order to obtain the base materials for producing the products and membranes according to the invention, four copolymers of vinyl alcohol and 4-vinylpyridine are prepared, respectively designated by the letters A, B, C and D.

a. Preparation of copolymer A.

Forty-three grams of vinyl acetate and 5.2 g. of freshly distilled 4-vinylpyridine are added with stirring, and under a nitrogen atmosphere, to 200 cm.$^3$ of a mixture of equal volumes of water and tertiary butanol heated to 60° C. After one-half hour 2 g. of polymerization initiator (azobisisobutyronitrile) are added, and then 1 g. of initiator and 5.2 g. of 4-vinylpyridine are added after 3 hours. Heating and stirring is continued for 17 hours. One liter of water is added to the reaction mass; the tertiary butanol is evaporated. The precipitate is filtered off, washed with 1 liter of water and dried under a pressure of 20 mm. of mercury at 60° C. A vinyl acetate-vinylpyridine copolymer is thus obtained in a yield of 77 percent by weight based on the whole of the monomers initially employed.

This copolymer is saponified as follows: A solution of 20 g. of copolymer in 280 cm.$^3$ of methanol is poured over the course of 10 minutes into a solution of 2.4 g. of KOH in 60 cm.$^3$ of methanol at 60° C. The stirring is continued and the temperature maintained for 5 hours. The precipitate is filtered off, washed with isopropanol and dried. The copolymer A thus obtained contains 1.4 percent by weight of nitrogen and has a reduced viscosity of 88 cm.$^3$/g., this viscosity being measured at 25° C. in a 5 g./liter solution in dimethylsulphoxide (DMSO).

b. Preparation of copolymer B.

Forty-three grams of vinyl acetate and 5.2 g. of freshly distilled 4-vinylpyridine are added with stirring and under a nitrogen atmosphere to 200 cm.$^3$ of a mixture of equal volumes of water and tertiary butanol heated to 60° C. After one-half an hour 2 g. of polymerization initiator (azobisisobutyronitrile) are added, and then, after 1.5 hours, a solution of 1 g. of initiator and 5.2 g. of 4-vinylpyridine in 45 cm.$^3$ of tertiary butanol is added gradually over the course of 1 hour. Heating and stirring are continued for 17 hours, 30 minutes. One liter of water is added to the reaction mass. The tertiary butanol is evaporated. The precipitate is filtered off, washed with 1 liter of water, and dried as before. A vinyl acetate-vinylpyridine copolymer is thus obtained in a yield of 79 percent by weight based on the whole of the monomers initially employed.

This copolymer is saponified as follows: A solution of 20 g. of copolymer in 280 cm.$^3$ of methanol is poured over the course of 10 minutes into a solution of 2.4 g. of KOH in 60 cm.$^3$ of methanol at 60° C. The stirring is continued and the temperature maintained for 5 hours. Two hundred cubic centimeters of isopropanol are added. The precipitate is filtered, washed with isopropanol and dried. A copolymer B containing 1.8 percent by weight of nitrogen and having a reduced viscosity, measured as previously, of 65 cm.$^3$/g. is obtained.

c. Preparation of copolymer C.

Forty-three grams of vinyl acetate and 5.2 g. of freshly distilled 4-vinylpyridine are added with stirring and under a nitrogen atmosphere to 200 cm.$^3$ of a mixture of equal volumes of water and tertiary butanol heated to 60° C. After one-half an hour 1 g. of polymerization initiator (azobisisobutyronitrile) are added, and then, after 3 hours, a solution of 2 g. of initiator and 5.2 g. of 4-vinylpyridine in 45 cm.$^3$ of tertiary butanol is gradually added over the course of 1 hour. The heating and stirring are continued for 16 hours. On liter of water is added to the reaction mass. The tertiary butanol is evaporated. The precipitate is filtered off, washed with 1 liter of water and dried. A vinyl acetate-vinylpyridine copolymer is thus obtained in a yield of 85 percent by weight based on the whole of the monomers initially employed.

This copolymer is saponified as follows: A solution of 20 g. of copolymer is 280 cm.$^3$ of methanol is poured over the course of 10 minutes into a solution of 2.4 g. of KOH in 60 cm.$^3$ of methanol at 60° C. The temperature is maintained and the stirring continued for 5 hours. Three hundred cubic centimeters of isopropanol are added. The product is filtered off, washed and dried. A copolymer C containing 2.1 percent by weight of nitrogen and having a reduced viscosity, measured as previously, of 64 cm.$^3$/g. is obtained.

d. Preparation of copolymer D.

Forty-three grams of vinyl acetate and 15.6 g. of freshly distilled 4-vinylpyridine are added with stirring and under a nitrogen atmosphere to 200 cm.$^3$ of a mixture of equal volumes of water and tertiary butanol heated to 60° C. After one-half an hour 3 g. of polymerization initiator (azobisisobutyronitrile) are added. The heating and stirring are continued for 20 hours. One liter of water is added to the reaction mass; the tertiary butanol is evaporated. The precipitate is filtered off, washed with 1 liter of water and dried. A vinyl acetate-vinylpyridine copolymer is thus obtained with a yield of 89 percent relative to the monomers initially employed.

This copolymer is saponified as follows: A solution of 20 g. of copolymer in 280 cm.$^3$ of methanol is poured over the course of 10 minutes into a solution of 2.4 g. of KOH in 60 cm.$^3$ of methanol at 60° C. The temperature is maintained and the stirring continued for 5 hours. Three hundred and fifty cubic centimeters of isopropanol are added. The product is filtered off, washed and dried. A copolymer D containing 2.8 percent by weight of nitrogen and having a reduced viscosity, measured as previously, of 64 cm.$^3$/g. is obtained.

EXAMPLES 1 to 3

These examples relate to the preparation by a single technique of three different membranes, starting from copolymers B, C and D respectively. First, 2 g. of copolymer are dissolved in 10 cm.$^3$ of dimethylsulphoxide at 75° C., and secondly 1,4-dimethyl-2,5-bis(chloromethyl)-benzene is dissolved in 5 cm.$^3$ of dimethylsulphoxide at about 25° C. The amount of the dichloride employed is equal to the stoichiometric amount calculated in accordance with the reaction:

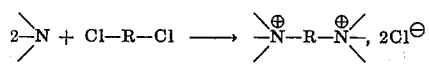

The two solutions thus prepared are mixed and stirring is continued for 5 minutes at about 25° C. The whole is cast onto a glass plate 10 cm. × 10 cm., and heated in an oven to 70° C. for 48 hours. After cooling, the film is detached from the plate, immersed for 7 hours in a refluxing solution of 10 percent by weight of methyl iodide in methanol, washed with methanol and then with water.

The characteristics of the membranes obtained are given in the Table below

| Example | Copolymer used | Amount of dichlorinated derivative (in g.) | Permeation selectivity in % | Substitution resistance in ohm.cm.$^2$ |
|---|---|---|---|---|
| 1 | B | 0.263 | 45 | 4 |
| 2 | C | 0.300 | 52 | 5 |
| 3 | D | 0.400 | 50 | 3.5 |

EXAMPLES 4 to 6

Examples 1 to 3 are repeated, multiplying the amounts of dichloride employed by a factor of 1.25 in each case. The membranes obtained having the following characteristics:

| Example | Copolymer used | Amount of dichlorinated derivative (in g.) | Permeation selectivity in % | Substitution resistance in ohm.cm.$^2$ |
|---|---|---|---|---|
| 4 | B | 0.328 | 50 | 5 |
| 5 | C | 0.375 | 53 | 7 |
| 6 | D | 0.500 | 45 | 6 |

EXAMPLES 7 to 9

Examples 1 to 3 are repeated, multiplying the amounts of dichloride employed by a factor of 0.75 in each case. The membranes obtained have the following characteristics:

| Example | Copolymer used | Amount of dichlorinated derivative (in g.) | Permeation selectivity in % | Substitution resistance in ohm.cm.$^2$ |
|---|---|---|---|---|
| 7 | B | 0.198 | 42 | 3.5 |
| 8 | C | 0.225 | 47 | 3.5 |
| 9 | D | 0.300 | 45 | 2 |

EXAMPLES 10 to 15

The membranes obtained in Examples 2, 3, 5, 6, 8 and 9 respectively are acetalized with formaldehyde. The following technique is employed. The nonacetalized membrane is immersed for 20 minutes at 67° C. in a bath consisting of 13.5 cm.$^3$ of 30 percent aqueous formaldehyde, 25 g. of anhydrous sodium sulphate, 22 cm.$^3$ of sulphuric acid ($d=1.83$), and 125 cm.$^3$ of water. The membranes are washed with methanol and then with water. They show the following properties:

| Example | Starting membrane prepared according to Example | Permeation selectivity in % | Substitution resistance in ohm.cm.$^2$ |
|---|---|---|---|
| 10 | 2 | 87 | 11 |
| 11 | 3 | 90 | 7.5 |
| 12 | 5 | 89 | 19 |
| 13 | 6 | 91 | 13 |
| 14 | 8 | 80 | 5 |
| 15 | 9 | 80 | 4 |

After being left for 24 hours at 25° C. in normal aqueous potassium hydroxide solution, the membrane of Example 11 has a permeation selectivity of 86 percent and a substitution resistance of 11 ohm.cm.$^2$.

EXAMPLES 16 to 18

Three membranes are prepared from a copolymer A, following the techniques described in Examples, 1, 4 and 7 respectively, and are then treated with formaldehyde as in Example 10. The membranes obtained show the following characteristics:

| Example | Method of working described in Examples | Permeation selectivity in % | Substitution resistance in ohm.cm.$^2$ |
|---|---|---|---|

| | | | |
|---|---|---|---|
| 16 | 1+10 | 73 | 10 |
| 17 | 4+10 | 78 | 15 |
| 18 | 7+10 | 65 | 5 |

The bursting pressure of the membrane of Example 16 is 2 bars and the deflection at the moment of bursting is 12.2 mm.

EXAMPLES 19 to 21

Three membranes are prepared according to the technique to Example 16, with the treatment with the formaldehyde bath being carried out at 70° C., and for various durations given in the table below. The characteristics of the films obtained are also given in the table below:

| Example | Duration of the formaldehyde treatment in minutes | Permeation selectivity in % | Substitution resistance in ohm.cm.$^2$ |
|---|---|---|---|
| 19 | 10 | 75 | 12.5 |
| 20 | 30 | 87 | 16 |
| 21 | 60 | 91 | 27 |

EXAMPLES 22 to 24

The membranes of Examples 2, 5 and 8 are subjected to the formaldehyde treatment described in Example 10 for 10 minutes at a temperature of 40° C. The membranes obtained show the following characteristics:

| Example | Starting material prepared according to Example | Permeation selectivity in % | Substitution resistance in ohm.cm.$^2$ |
|---|---|---|---|
| 22 | 2 | 52 | 4 |
| 23 | 5 | 60 | 6.5 |
| 24 | 8 | 46 | 2.2 |

EXAMPLES 25 to 27

The procedure of Examples 22 to 24 is followed, but the formaldehyde treatment is carried out for 30 minutes. The membranes obtained show the following characteristics:

| Example | Permeation selectivity in % | Substitution resistance in ohm.cm.$^2$ |
|---|---|---|
| 25 | 67 | 5.5 |
| 26 | 68 | 6.5 |
| 27 | 56 | 3 |

EXAMPLES 28 to 30

The procedure of Examples 22 to 24 is followed but the formaldehyde treatment is carried out for 2 hours. The membranes obtained show the following characteristics:

| Example | Permeation selectivity in % | Substitution resistance in ohm.cm.$^2$ |
|---|---|---|
| 28 | 83 | 8.5 |
| 29 | 85 | 13.5 |
| 30 | 76 | 4.5 |

EXAMPLES 31 to 33

Membranes prepared according to Example 2 are subjected to the formaldehyde treatment described in Example 10 for 20 minutes at various temperatures. The membranes obtained show the following characteristics:

| Example | Temperature | Permeation selectivity in % | Substitution resistance in ohm.cm.$^2$ |
|---|---|---|---|
| 31 | 40 | 62 | 4.5 |
| 32 | 55 | 80 | 10 |
| 33 | 70 | 87 | 11 |

EXAMPLES 34 to 42

Examples 10 to 18 are repeated, the acetalization being carried out at 70° C., with a bath of the following composition: 4 cm.$^3$ of n-butyraldehyde, 12 cm.$^3$ of hydrochloric acid ($d$=1.18), and 135 cm.$^3$ of isopropanol. The membranes obtained show the following characteristics:

| Example | Product subjected to acetalization similar to that of Example | Permeation selectivity in % | Substitution resistance in ohm.cm.$^2$ |
|---|---|---|---|
| 34 | 10 | 90 | 11.5 |
| 35 | 11 | 91 | 11 |
| 36 | 12 | 91 | 21 |
| 37 | 13 | 92 | 18.5 |
| 38 | 14 | 77 | 4.5 |
| 39 | 15 | 82 | 4 |
| 40 | 16 | 91 | 13 |
| 41 | 17 | 91 | 28 |
| 42 | 18 | 65 | 4.5 |

The bursting pressure of the membrane of Example 35 is 3 bars and the deflection on bursting is 12.5 mm. The water transmission of the membrane is 17 mm.$^3$/hour/cm.$^2$. After remaining in the normal aqueous potassium hydroxide solution for 24 hours at 25° C., the same membrane has a permeation selectivity of 87 percent and a substitution resistance of 15 ohm.cm.$^2$.

The bursting pressure of the membrane of Example 40 is 2.7 bars and the deflection on bursting is 13.9 mm.

After remaining in pure water at 80° C., for 24 hours the membrane of Example 41 has a permeation selectivity of 92 percent and a substitution resistance of 20 ohm.cm.$^2$.

EXAMPLE 43

A. Preparation of a vinyl alcohol/4-vinylpyridine copolymer

Seven hundred and seventy-four grams of vinyl acetate and 281 g. of 4-vinylpyridine are added with stirring and in an inert atmosphere to 3,600 cm.$^3$ of a mixture of equal volumes of water and tertiary butanol. The mixture is heated to 60° C. and 31.65 g. of azobisisobutyronitrile are added to it. The heating and stirring are continued for 20 hours. Eighteen hundred cubic centimeters of tertiary butanol at 20° C. are then added to the reaction mixture and the whole is heated to 50° C. A solution of 360 g. of sodium hydroxide in 1,800 cm.$^3$ of water is gradually added over the course of 30 minutes. The heating and stirring is continued for 2 hours. The mixture is cooled and run into 25 l. of tertiary butanol. The precipitate is filtered off and washed with 2 portions of 5 l. of methanol at 0° C. The product is dried for 36 hours at 50° C., under a partial vacuum (100 mm. of mercury). One hundred and a forty-two grams of this polymer are washed with 3 portions of 1 l. of water at 5° C., and dried to constant weight at 50° C., under 100 mm. of mercury. One hundred and twenty-two grams of a polymer containing 2.2 percent by weight of nitrogen are thus obtained.

B. Preparation of an ion-exchange membrane

A solution of 6 g. of the copolymer prepared in the preceding paragraph (A), dissolved in 30 cm.$^3$ of D.M.S.O., is mixed with a solution of 0.87 g. of 1,4-dimethyl-2,5-bis(chloromethyl)-benzene in 15 cm.$^3$ of D.M.S.O. The mixture is stirred for 5 minutes at about 20° C., and the whole is cast on a glass plate 25 cm. × 12 cm. and heated for 48 hours to 70° C. The film thus obtained is immersed into 740 g. of a methanolic solution containing 10 percent by weight of methyl iodide, heated to 65° C. for 5 hours, and washed with methanol. An acetalization is then carried out by immersing the film for 20 minutes at 70° C. in a mixture containing 1,000 cm.$^3$ of isopropanol, 104 cm.$^3$ of aqueous hydrochloric acid (density: 1.35), and 30 g. of n-butyraldehyde. The film is washed with isopropanol and then with pure water.

An 0.16 mm. thick membrane having a permeation selectivity of 90 percent and a substitution resistance of 9Ω cm.² is obtained. Its bursting pressure is 2.8 bars and the deflection at the moment of bursting is 12.9 mm.

EXAMPLE 44

Example 43 is repeated, replacing the methyl iodide by benzyl chloride. A membrane having a permeation selectivity of 83 percent and a substitution resistance of 11.5Ω cm.² is obtained. Its bursting pressure is 3 bars and the deflection at the moment of bursting is 12.1 mm.

EXAMPLE 45

Example 43 is repeated, replacing the dimethyl-bis(chloromethyl)-benzene by 0.8 g. of polyepichlorhydrin (molecular weight: 2,000). A membrane having a permeation selectivity of 83 percent and a substitution resistance of 4.5Ω cm.² is obtained. Its bursting pressure is 1.1 bars and the deflection at the moment of bursting is 6.7 mm.

EXAMPLE 46

Example 44 is repeated, replacing the dimethyl-bis(chloromethyl)-benzene by 0.8 g. of polyepichlorhydrin (molecular weight: 2,000). A membrane having a permeation selectivity of 89 percent and a substitution resistance of 9Ω cm.² is obtained. Its bursting pressure is 1.6 bars and the deflection at the moment of bursting is 6.8 mm.

EXAMPLE 47

Example 43 is repeated, the acetalization being carried out by immersing a film 6 cm. × 10.5 cm. in a mixture of 200 cm.³ of isopropanol, 21 cm.³ of aqueous hydrochloric acid (density: 1.35), and 6 cm.³ of a 40 percent strength by weight solution of glyoxal in water. A membrane having a substitution resistance of 5Ω cm.² is obtained.

We claim:

1. An ungrafted copolymer in the form of an ion-exchange resin consisting essentially of, in a numerical ratio from 0.02:1 to 0.5:1, vinyl alcohol units and units of a vinyl monomer containing at least one tertiary nitrogen atom selected from 2- and 4-vinylpyridines, cross-linked to a degree from 30 percent to 100 percent by polyquaternary ammonium linkages of the formula:

where the indicated nitrogen atoms are nitrogen atoms of units of the said vinyl monomer containing at least one tertiary nitrogen atom, R is selected from alkylene of two to six carbon atoms, xylylene, methyl-xylylene, dimethyl-xylylene, or a residue of formula:

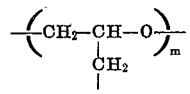

where $m$ is an integer, derived from polyepichlorhydrin, and $n$ is an integer of at least 2.

2. A copolymer as claimed in claim 1 wherein R is a substituted or unsubstituted organic radical selected from alkylene of two to six carbon atoms, xylylene, methyl-xylylene or dimethyl-xylylene.

3. A copolymer as claimed in claim 1 in which the units of the said vinyl monomer containing at least one tertiary nitrogen atom are units of the formula:

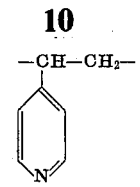

and some or all of these units are joined via linkages of the formula:

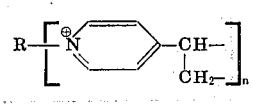

where R and $n$ are as defined in claim 1.

4. A copolymer as claimed in claim 1 in which part or all of the nitrogen atoms of the units of the vinyl monomer containing at least one tertiary nitrogen atom, which are not linked to the said R radical, are quaternized by a monoquaternizing agent.

5. A copolymer as claimed in claim 4 in which the monoquaternizing agent is a lower alkyl halide or sulphate, a benzyl halide, or a cyclohexyl halide.

6. A copolymer as claimed in claim 1 in which the hydroxyl groups have been partly or completely acetalized.

7. A copolymer as claimed in claim 6 in which the hydroxyl groups have been acetalized with an aldehyde of formula R'—CHO, where R' is hydrogen, alkyl of one to four carbon atoms, phenyl, or furyl, or with glyoxal.

8. An anion-exchange membrane comprising a copolymer as claimed in claim 1.

9. A copolymer as claimed in claim 1 in which the numerical ratio of units of the said vinyl monomer containing at least one tertiary nitrogen atom to vinyl alcohol units is 0.04:1 to 0.25:1.

10. Process for the preparation of a cross-linked copolymer containing quaternary ammonium groups in the form of an ion-exchange resin which comprises reacting at a temperature of 10°–100° C. a copolymer containing vinyl alcohol units and units of a vinyl monomer containing at least one tertiary nitrogen atom selected from 2- and 4-vinylpyridines with as much of a polyquaternizing agent having the formula: R[X]$_n$, where X is a reactive ester residue selected from a halogen atom and a sulphonic or sulphuric ester residue, R is selected from alkylene of two to six carbon atoms, xylylene, methyl-xylylene, dimethyl-xylylene, or a residue of formula:

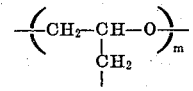

where $m$ is an integer, derived from polyepichlorhydrin, and $n$ is an integer of at least 2, as will cross-link at least 30 percent of the nitrogen-containing units.

11. Process according to claim 10 wherein R is selected from alkylene of two to six carbon atoms, xylylene, methyl-xylylene or dimethyl-xylylene.

12. Process according to claim 10 in which the units of the vinyl monomer containing at least one tertiary nitrogen atom are units of the formula:

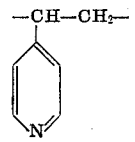

13. Process according to claim 10 in which the numerical ratio in the copolymer starting material of units of the said vinyl monomer containing at least one tertiary nitrogen atom to vinyl alcohol units is 0.02:1 to 0.5:1.

14. Process according to claim 13 in which the said ratio is 0.02:1 to 0.5:1.

15. Process according to claim 10 in which the copolymer is also reacted with a monoquaternizing agent at a temperature of 10°–100° C.

16. Process according to claim 15 in which the monoquaternizing agent is a lower alkyl halide or sulphate, a benzyl halide, or a cyclohexyl halide.

17. Process according to claim 10 in which the quaternization is effected at 25° to 70° C.

18. Process according to claim 10 in which the reaction product is further reacted with an aldehyde at a temperature of 10° to 100° C. to effect acetalization of the hydroxyl groups therein.

19. Process according to claim 18 in which the acetalization is effected at 30° to 80° C.

20. Process according to claim 18 in which the aldehyde has the formula: R'CHO where R' is hydrogen, alkyl of one to four carbon atoms, phenyl, or furyl.

21. Process according to claim 10 in which the initial copolymer is in the form of a membrane and the final product is a membrane.

22. An anion-exchange membrane comprising a copolymer produced by the process of claim 10.

* * * * *